United States Patent [19]

Jordan

[11] 4,114,588
[45] Sep. 19, 1978

[54] VALVE DEACTUATOR FOR INTERNAL COMBUSTION ENGINES

[76] Inventor: Edgar R. Jordan, 32260 W. 12 Mile Rd., Farmington, Mich. 48024

[21] Appl. No.: 699,612

[22] Filed: Jun. 24, 1976

[51] Int. Cl.² .............................................. F02D 13/06
[52] U.S. Cl. ............................. 123/198 F; 123/90.43; 123/90.46
[58] Field of Search ............. 123/198 F, 90.43, 90.46, 123/90.16, 90.12, 90.13, 90.14, 90.63, 90.39, 90.41

[56] References Cited

U.S. PATENT DOCUMENTS 2,394,738  2/1946  Anthony .................. 123/198 F X
2,745,391  5/1956  Winkler .................... 123/198 F X
3,463,131  8/1969  Dolby ..................... 123/90.43 X
3,964,455  6/1976  Brown ..................... 123/90.43

*Primary Examiner*—Charles J. Myhre
*Assistant Examiner*—Ira S. Lazarus
*Attorney, Agent, or Firm*—Reising, Ethington, Barnard, Perry & Brooks

[57] ABSTRACT

A valve deactuator for an internal combustion engine is disclosed that utilizes a body of trapped liquid to permit a rocker arm to actuate its associated valve. When the liquid is released the rocker arm no longer makes its normal valve-opening excursion in response to movement of its associated pushrod.

19 Claims, 9 Drawing Figures

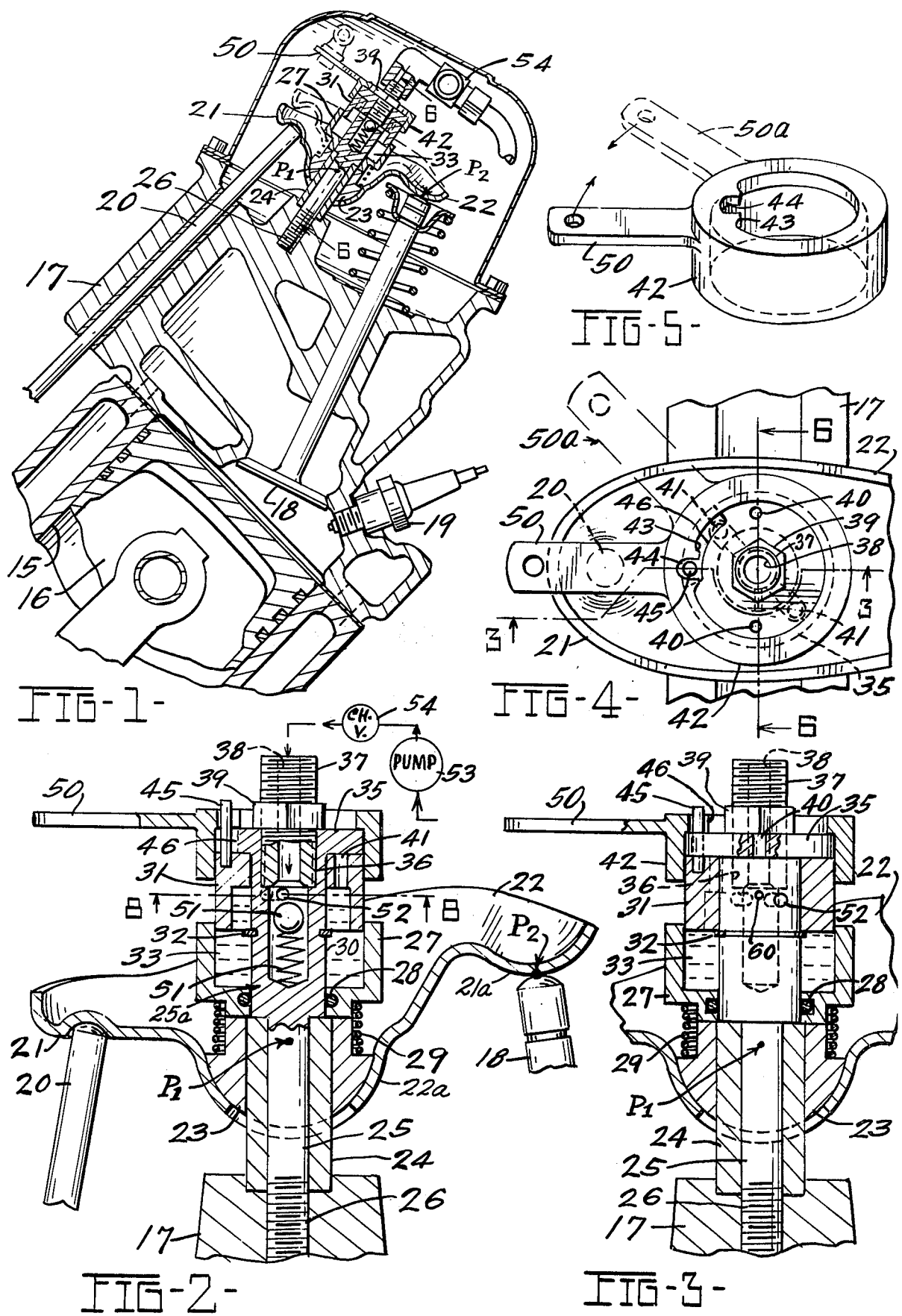

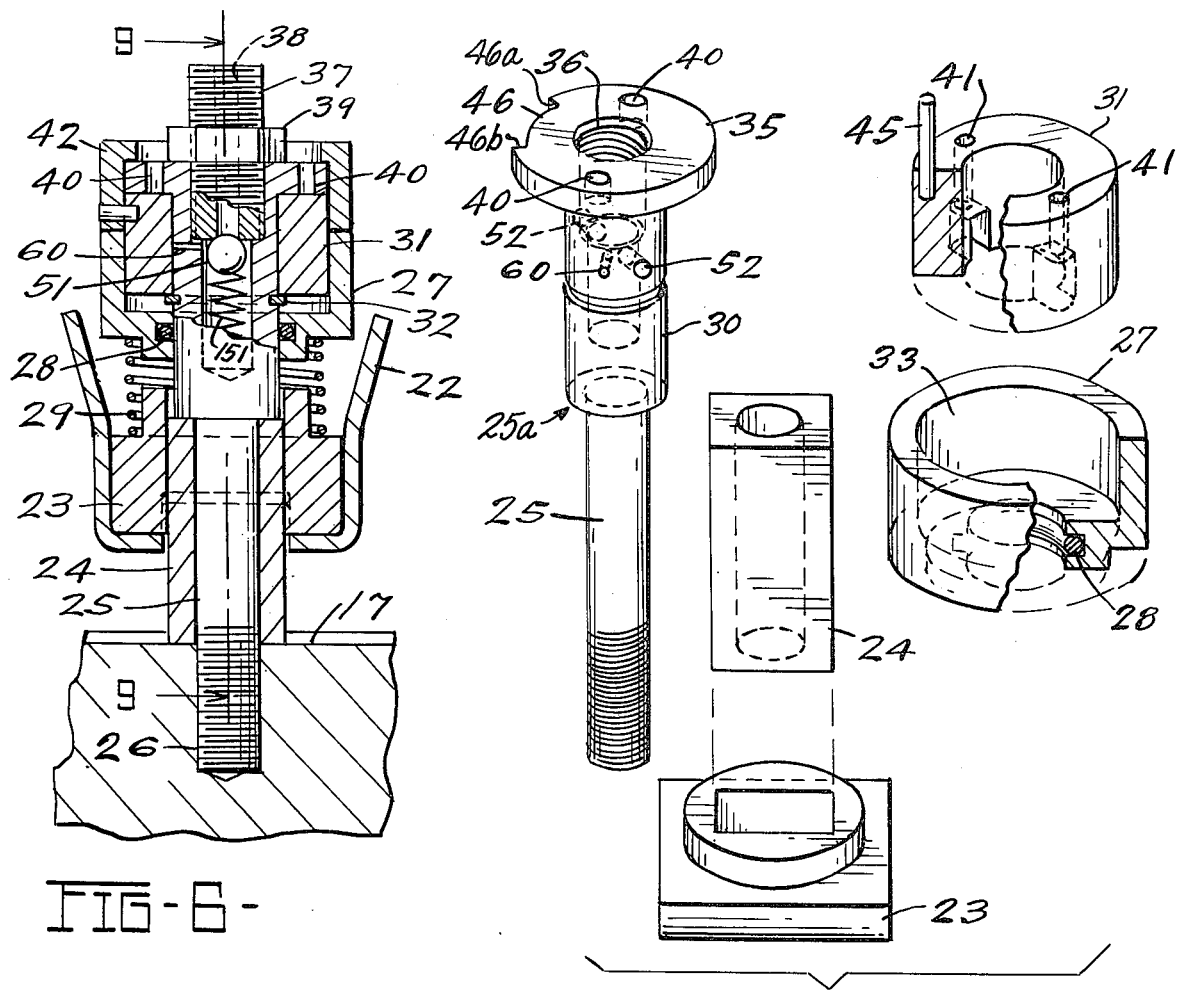
FIG-6-
FIG-7-
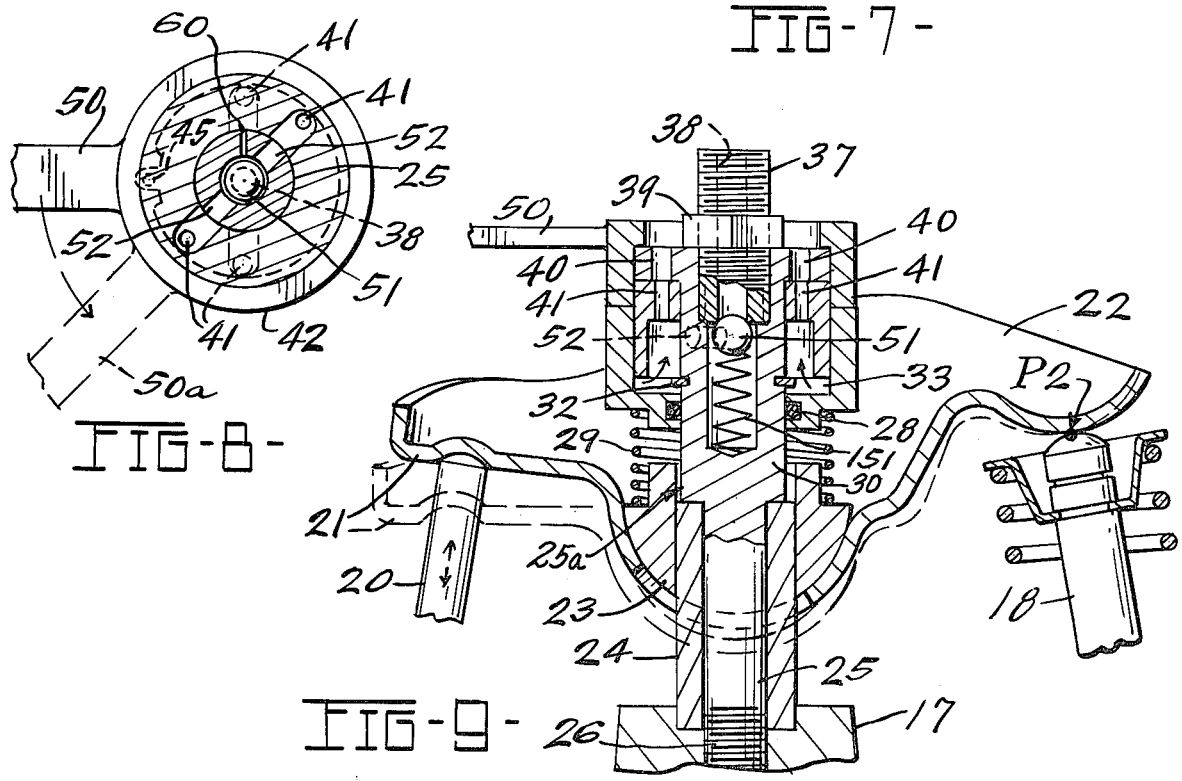
FIG-8-
FIG-9-

VALVE DEACTUATOR FOR INTERNAL COMBUSTION ENGINES

BACKGROUND OF THE INVENTION

It has been frequently proposed to increase the fuel efficiency of a multi-cylinder internal combustion engine at light loads by disabling certain of the cylinders so that they do not burn fuel. For example, an eight cylinder automotive engine can be operated very satisfactorily on four cylinders when the vehicle is cruising at highway speeds, idling, or decreasing in speed. The full load output of the engine may be as much as 200 horsepower and yet the demand at cruising speeds may be only 30 or 40 horsepower. If four of the cylinders draw no fuel, the light load can be economically absorbed at a fuel saving approaching 40 percent. The driver notices no difference in smoothness of operation and if the four disabled cylinders can be reactivated at will or automatically when the load demand increases there is no overall loss of performance.

The various devices proposed to perform the desired function have either required extensive engine modifications (e.g. shiftable cam shafts) or have not been sufficiently rapid in response to be practicable.

BRIEF SUMMARY OF THE INVENTION

The mechanism of the present invention is arranged to permit a vehicle operator to disable one or a group of cylinders of an internal combustion engine by keeping the valves of the disabled cylinders closed. The mechanism is applied to an overhead valve train which includes a rocker arm normally pivoting about an axis intermediate its ends. The invention provides hydraulically actuated means whereby the rocker arm is released from its normal pivot position and is caused to pivot about the valve end so that a pushrod-applied motion to the opposite end causes the normally stationary axis of the rocker arm to move in an arc around the valve end. The force applied to the valve stem during such an excursion is insufficient to overcome the normal force of the valve spring at the pivot end of the arm.

In normal operation of the engine valve a body of liquid (preferably engine oil) is trapped in a chamber between a fixed wall and a second wall so that the second wall is held apart from the first. In the valve disabling position the trapped oil is discharged and the second wall becomes movable with respect to the fixed wall.

Two series-arranged control valves are provided. In a first position a first inlet valve opens communication between the above-mentioned chamber and a source of oil under pressure such as the engine oil pump. In this first position a second of the series valves is closed and oil becomes trapped in the chamber. In the second position of the valves, the second valve is opened to permit discharge from the chamber and at the same time the first or inlet valve is closed. The two valves may be operated manually or automatically by a sensor which responds, for example, to engine load or to accelerator position. At higher loads it is desirable to have all of the engine cylinders firing and no valve disabled, but at low loads it is desirable to have one or more of the cylinders disabled which requires applying the mechanism of the present invention to both the intake and exhaust valves of the engine.

BRIEF DESCRIPTION OF THE DRAWINGS

FIG. 1 is a diagrammatic vertical, sectional, view through an internal combustion engine having an overhead valve, the valve train of which incorporates the present invention;

FIG. 2 is a somewhat enlarged central, vertical, sectional view of the mechanism of the present invention;

FIG. 3 is a fragmentary sectional view taken on line 3—3 of FIG. 4;

FIG. 4 is a fragmentary top plan view;

FIG. 5 is a perspective view of a detailed valve control mechanism forming a part of the present invention;

FIG. 6 is a sectional view taken on line 6—6 of FIG. 1;

FIG. 7 is a composite perspective view showing the principal components of the apparatus of the present invention;

FIG. 8 is a section on line 8—8 of FIG. 2; and

FIG. 9 is a view similar to FIG. 2 with the parts in a second operating position.

DETAILED DESCRIPTION OF A PREFERRED EMBODIMENT

In the drawings the invention is shown applied to a diagrammatically indicated internal combustion engine having an engine cylinder 15 and a piston 16 working therein. The engine cylinder head is indicated at 17. In the drawings only the intake valve is shown and the mechanism applied thereto is duplicated on the exhaust valve. The intake valve is indicated at 18 and the spark plug 19 fires the charge in a normal manner.

The valve train comprises input means in the form of a pushrod 20 which contacts the so-called tappet or input end 21 of a boat-shaped rocker arm indicated generally at 22. The rocker arm has a central portion 22a, and an output end 21a. A cylindrical bearing or fulcrum member 23 is seated on the upper surface of the central portion 22a. The bearing is received around a square orienting spacer member 24 which is held in place by a support member including an upper tubular portion 30 with a conventional central mounting stud portion 25 depending therefrom and which is screwed into the top of the cylinder head as at 26. The mounting stud portion 25 is received in the spacer 24, the spacer maintains the proper orientation of the rocker arm with respect to its bearing and is conventional.

A movable housing member in the form of a cup member 27 surrounds a cylindrical portion of the tubular portion of the support member with an O-ring seal 28 therebetween and a spring 29 is interposed between the bottom of the cup member 27 and the top of the rocker arm bearing 23. Normally, the rocker arm pivots about a pivot point P-1 indicated in FIGS. 2 and 3.

The movable cup member 27 is slidable up and down over a cylindrical bearing surface 30 on the tubular portion 30 of the support member 21a. A rotatable valve block 31 is held on the stud 25 by a C-ring 32, but is free to rotate relative to the stud. During normal operation of the engine the movable cup member 27 is held apart from the valve block 31 by a trapped body of fluid in a chamber 33 formed between the valve block 31 and the cup member 27, as more fully described hereinafter. The spring 29 normally urges the cup 27 upwardly towards a position in which fluid is expelled from chamber 33.

The support member 25a is provided with an upper flange 35 and the stud is bored at 36 to receive a fluid coupling 37 which has a central fluid supply passage 38 and a threaded exterior to receive a locknut 39 which bears against the top of the flange 35 to lock the fluid coupling 37 in place. The flange confines the rotatable valve block 31 against the C-ring 32.

Drain passages 40 are provided in the flange. In one position the movable valve block 31 which is provided with passages 41, occupies a position in which the passages 41 register with the passages 40 to open communication for oil trapped in chamber 33 to be exhausted. In all other positions passages 41 in the valve block are out of registry with passages 40. The valve block 31 is moved from one position to another by an operator 42 which fits over the valve block and stud flange and has an inwardly projecting arm 43 with a slot 44 therein, in which slot a pin 45 fixed on the valve block is received. The flange 35 is cut away as at 46 to accommodate the rotational movement of the pin 45 by the operator 42. The operator 42 is actuated in any suitable manner and in the drawings includes a radially projecting arm 50 to which a suitable actuating mechanism indicated only by dotted lines is attached. In practice, a simple rod is connected to each of the projecting arms 50 so that by moving the rod, all of the linked arms may be moved and each of the operators 42 will be shifted simultaneously from one operating position to another to drain or fill the chambers 33 as hereinafter described.

A ball check valve 51, pressed by spring 151 against the end of the central passage in the liquid coupling 37 permits oil to flow through the coupling 37 and out a pair of cross passages 52 (FIG. 8) drilled in the stud so that oil may be supplied from a source of fluid pressure, such as an engine oil pump diagrammatically indicated at 53 in FIG. 2. A check valve 54 is provided in the line between the pump 53 and the fluid coupling 37 to prevent drainback when the engine is shut off.

When the drain openings 40 and 41 are closed, pressure from the pump 53 causes oil to flow past check valve 51 through the stud cross passage 52 into chamber 33. As the chamber 33 fills, the cup 27 is moved downwardly against spring 29 to urge the rocker arm bearing 23 to its lower position. When the drain openings 40 and 41 are in registry oil is permitted to discharge rapidly from chamber 33 and cup 27 and the rocker arm bearing 23 moves rapidly upward under the bias of spring 29 and the upward movement of the pushrod to the position indicated in FIG. 9. The rocker arm continues its rocking motion around the displaced bearing 23, but the pivot point for the rocker arm is now moved out to point $P_2$ at the valve end, and the engine valve, be it intake or exhaust, is not opened. A small bleed passage 60 from the oil supply passage 36 into the chamber 33 is provided, which passage is open when the chamber 33 is collapsed. This permits a small quantity of oil to pass continually through the chamber when running with the cylinder group disabled. The bleed passage 60 is closed by the movable valve block 31 when the engine is operating on all cylinders and oil is trapped in the now-expanded chamber 33 the valve block 31 and housing member 27 make up a rocker arm fulcrum control unit that is extendable and retractable. When the chamber 33 expands as shown in FIG. 2, the rocker arm fulcrum control unit extends to the position shown in FIG. 2 with the housing member 27 seated against the spacer 24 to engage and hold the fulcrum member 23 in its fixed position to cause the rocker arm 22 to pivot about the fulcrum member 23 in response to movement of the input means 20. When the rocker arm fulcrum control unit is contracted as is shown in FIG. 9, with the chamber 33 collapsed, the housing member 27 is in a position to permit the fulcrum member 23 to reciprocate along the support member 25a and the rocker arm 22 to pivot about its engagement at $P_2$ with the valve 18 in response to movement of the input means 20 such that the pivoting action of the rocker arm transmits no movement to the valve 18.

OPERATION

When the engine is running normally on all cylinders, the position of the parts is as shown in FIGS. 1 and 2. Oil has entered chamber 33 between the rotatable valve block 31 and the cup 27 from the pump 53 and check valve 54 is closed, but may open periodically to make up for any leakage of oil out of the chamber. The trapped body of oil in the chamber holds the cup 27 down against the force of spring 29. In this position the valve block 31 constitutes a fixed wall of chamber 33 and the cup 27 constitutes a movable wall. The engine valve 18 is opened by pushrod 20 with the rocker arm pivoting about point $P_1$.

Assume now that certain of the engine cylinders is or are to be deactivated. The actuator 50 for the rotatable valve block 31 is moved to its second operative position and through the radially directed yoke 43 and pin 45 moves the valve block 31 to a position in which ports 40 and 41 are in registry, and the cross ports 52 through the stud are closed. The ports now stand in the position shown in FIG. 9. The body of oil that had been previously trapped in chamber 33 has been spilled out. Spring 29 and pushrod movement has now urged the movable cup 27 to its upper position and the rocker arm bearing 23 has moved upwardly on its guide 24. The rocker arm now rotates about the end of the valve 18, as at point $P_2$ in FIG. 9 with a force that is insufficient to open the valve against the force of the normal valve spring. The associated cylinders receive no fuel and the engine continues to run on only the cylinders which remain in normal operation.

In general, one-half of the total number of engine cylinders will be deactivated; four cylinders in an eight cylinder engine, three cylinders in a six cylinder engine or two cylinders in a four cylinder engine.

To reactivate the cylinder to normal operation the actuator 50 is moved back to its first position closing passages 40 and 41 and opening the stud cross passages 52. Oil from the engine lubricating oil pump enters rapidly and moves the cup 27 down against the force of spring 29. The pushrod then causes the rocker arm to make a normal excursion around its center, $P_1$.

What I claim is:

1. An internal combustion engine having a valve movable between open and closed positions to control an intake or exhaust port, valve biasing means urging said valve to it closed position, movable input means, an elongated support member having one end mounted between said valve and input means, a slotted rocker arm slidably receiving said support member and engaging said input means and valve on opposite sides of said support member, a fulcrum member slidably mounted on said support member and seated against said rocker arm on the side thereof opposite said one end, and hydraulic valve deactivating means having (1) an active condition in which said fulcrum member is held in a fixed position on said support member to cause said rocker arm to pivot about said fulcrum member in response to movement of said input member to cause opening and closing movement of said valve, and (2) an inactive condition in which said fulcrum member reciprocates on said support member and said rocker arm pivots about its engagement with said valve in response to movement of said input means such that the pivoting action of said rocker arm transmits no movement to said valve; said valve deactivating means including a rocker arm fulcrum control unit mounted on said support member between the other end of said support member and said fulcrum member, said fulcrum control unit being extendable to a position to engage and hold said fulcrum member in its fixed position and retractable to a position to permit the fulcrum member to reciprocate along said support member, said fulcrum control unit having a chamber that expands and contracts when fluid is, respectively, admitted to and exhausted from said chamber to cause extension and retraction, respectively, of said control unit; and said deactivating means further including flow control means for selectively controlling the flow of fluid into and out of said chamber.

2. An engine as claimed in claim 1 wherein said rocker arm fulcrum control unit includes first and second members telescopically engaged with each other and wherein said first member is seated against said fulcrum member and is axially movable with respect to said support member.

3. An engine as claimed in claim 2 wherein said second member is secured against axial movement with respect to said support member, and wherein at least one of said first and second members is rotatable about the axis of said support member and is restrained against rotation with respect to the axis of said support member.

4. An engine as claimed in claim 3 wherein said flow control means includes flow control ports formed in said one member and said support member operable to control the flow of fluid into and out of said chamber in accordance with the angular position of said one member with respect to said support member.

5. An engine as claimed in claim 4 wherein said hydraulic valve deactivating means includes a supply passage formed in said support member having an inlet end for communicating with a source of fluid, and a cross-port in said support member communicating with said supply passage.

6. An internal combustion engine as claimed in claim 5 including a check valve in said supply passage operable for preventing back flow of fluid from said chamber toward the inlet end of said supply passage but permitting free flow of fluid from the inlet end of said supply passage toward said chamber.

7. An internal combustion engine as claimed in claim 6 further including a bleed passage in said support member communicating with said supply passage and for permitting limited flow through said chamber when said chamber is contracted.

8. An engine as claimed in claim 5 wherein said first member comprises a cup-shaped housing member having an end wall that defines a movable wall of said chamber, and a side wall projecting from said end wall.

9. An engine as claimed in claim 8 wherein said second member comprises a valve block mounted on said support member on the side of said cup-shaped housing member opposite said fulcrum member and slidably received by the side wall of said cup-shaped housing member, said valve block being rotatable with respect to said support member but restrained against axial movement with respect to said support member.

10. An engine as claimed in claim 9 wherein said flow control ports include at least one drain port formed in said support member, and at least one valve block passage formed in said valve block, said valve block being selectively rotatable about the axis of said tubular portion between a supply position in which said valve block passage is in fluid communication with said cross-port and is blocked from communication with said drain port to cause said chamber to expand and said end wall of said housing to move with respect to said valve block and extend said fulcrum control unit when fluid is admitted to said chamber through said valve block passage from said supply passage, and an exhaust position in which said valve block passage is blocked from fluid communication with said cross-port and is in communication with said drain port to permit fluid to be discharged from said chamber and said end wall of said housing member to move to its retracted position with respect to said valve block and retract said fulcrum control unit.

11. An engine valve deactivator assembly for controlling the pivot point of an engine valve operating rocker arm, said deactivator assembly comprising: a support member including a tubular portion with a supply passage formed therein, said supply passage having an open end at one end of said tubular portion defining an inlet for connecting said supply passage with a source of fluid, said supply passage having a closed end adjacent the other end of said tubular portion; at least one cross-port in the wall of said tubular portion between the ends of said supply passage; a rocker arm fulcrum control unit mounted on said tubular portion, said control unit incuding a valve block and a housing member telescopically engaged with each other; said valve block having upper and lower ends and an inner cylindrical surface surrounding the outer surface of said tubular portion along at least a portion of the length thereof; said valve block being rotatable with respect to said support member but restrained against axial movement with respect to said tubular portion; at least one drain passage formed in said support member; at least one valve block passage formed in said valve block; said housing member slidably mounted on said tubular portion and cooperating with said valve block to form an expansible chamber that communicates with said valve block passage; said housing member having an end wall defining a movable wall of said expansible chamber and being movable between extended and retracted positions with respect to said valve block along the length of said tubular portion when fluid is respectively admitted to and exhausted from said chamber; said valve block being selectively rotatable about the axis of said tubular portion between a supply position in which said valve block passage is in fluid communication with said cross-port and is blocked from communication with said drain passage to cause said chamber to expand and said end wall of said housing to move to its extended position with respect to said valve block when fluid is admitted to said chamber through said valve block passage from said supply passage, and an exhaust position in which said valve block passage is blocked from fluid communication with said cross-port and is in communication with said drain passage to permit fluid to be discharged from said chamber and said end wall of said housing member to move to its retracted position with respect to said valve block.

12. An assembly as claimed in claim 11 further including a check valve in said supply passage operable for preventing back-flow of fluid from said chamber toward the inlet end of said supply passage but permitting free flow of fluid from the inlet end of said supply passage toward said chamber.

13. An assembly as claimed in claim 11 wherein said housing member comprises a cup-shaped member having a side wall projecting from said end wall and slidably receiving said valve block.

14. An assembly as claimed in claim 13 further including means defining a stop shoulder projecting outwardly from said tubular member at the end thereof adjacent the closed end of said supply passage, said end wall of said housing engaging said stop shoulder in its extended position.

15. An assembly as claimed in claim 14 wherein a mounting stud projects from the lower end of said tubular member adjacent the closed end of said supply passage for securing said support member to engine structure.

16. An assembly as claimed in claim 15 wherein said mounting stud is of smaller cross-section than said tubular member such that the lower end of said tubular member projects outwardly from said mounting stud, and further including a spacer sleeve receiving said mounting stud with the upper end of said spacer sleeve engaging the lower end of said tubular member, said upper end of said spacer sleeve projecting outwardly from said tubular member to define said stop shoulder.

17. An internal combustion engine of the type having a valve movable between open and closed positions to control an intake or exhaust port; valve biasing means urging said valve to its closed position; movable input means; an elongated support member formed with a mounting stud located between said valve and said input means; a rocker arm formed with a slot intermediate its ends, said slot slidably receiving said support member; a fulcrum member in the form of a pivot bearing slidably received on said support member and seated against said rocker arm on the side thereof adjacent one end of said support member, said rocker arm engaging said input means and said valve on opposite sides of said support member for normally rocking about said pivot bearing to cause said valve to open and close in response to movement of said input means in cooperation with said valve biasing means; and hydraulic control means carried by said support member operable to selectively deactivate said rocker arm by causing said pivot bearing to reciprocate along said support member and said rocker arm to pivot about its engagement with said valve in response to movement of said input means to prevent said rocker arm from transmitting opening force to said valve against said valve biasing means, said hydraulic control means including a supply passage formed in said support member and at least one exhaust passage, said supply passage having an inlet opening formed at said one end of said support member for connection with a source of hydraulic fluid, said hydraulic control means including a housing received on said support member between said one end of said support member and said pivot bearing, said housing being formed with an expansible and contractable chamber, said housing having an axially movable wall defining a movable wall of said expansible chamber, said hydraulic control means including supply and exhaust valve means for selectively connecting said chamber with said supply passage and exhaust passage to respectively cause said chamber to expand when hydraulic fluid is supplied thereto through said supply passage and to contract when said chamber is connected to said exhaust passage; said axially movable wall being hydraulically extended along said support member into engagement with said pivot bearing when said chamber is expanded to hold said pivot bearing in position and prevent said pivot bearing from reciprocating along said support member, said axially movable wall being reciprocable along said support member when said chamber is contracted to permit reciprocation of said pivot bearing to deactivate said rocker arm such that said rocker arm pivots about its engagement with said valve in response to movement of said input means.

18. An internal combustion engine as claimed in claim 17 including a check valve in said supply passage operable for preventing back flow of fluid from said chamber toward the inlet end of said supply passage but permitting free flow of fluid from the inlet end of said supply passage toward said chamber.

19. An internal combustion engine as claimed in claim 18 further including a bleed passage in said support member communicating with said supply passage and for permitting limited flow through said chamber when said chamber is contracted.

* * * * *

UNITED STATES PATENT AND TRADEMARK OFFICE
CERTIFICATE OF CORRECTION

PATENT NO. : 4,114,588
DATED : September 19, 1978
INVENTOR(S) : Edgar R. Jordan

It is certified that error appears in the above-identified patent and that said Letters Patent are hereby corrected as shown below:

Column 2, line 42
before "conventional" insert --support member indicated collectively by reference numeral 25a and including an upper tubular portion 30 with a--.

Column 2, line 57
"21a" should be --25a--.

Column 6, line 33 (Claim 11) "incuding" should be --including--.

Column 6, line 43 (Claim 11) after "ber" and before "slidably" insert --being--.

Signed and Sealed this

Eleventh Day of December 1979

[SEAL]

*Attest:*

SIDNEY A. DIAMOND

*Attesting Officer*      *Commissioner of Patents and Trademarks*